United States Patent Office 3,338,835
Patented Aug. 29, 1967

3,338,835
GLYCOL BASED, HYDRAULIC FLUID ADDITIVE
John H. Wright, Berkley, Mich., assignor to Chrysler Corporation, Highland Park, Mich., a corporation of Delaware
No Drawing. Filed Jan. 28, 1965, Ser. No. 428,860
1 Claim. (Cl. 252—75)

This application is a continuation-in-part of my copending application Ser. No. 106,441, filed May 1, 1961, which in turn was a continuation-in-part of application Ser. No. 775,699, filed Nov. 24, 1958, and which has now issued as U.S. 2,982,733. Application Ser. No. 775,699 was a division of application Ser. No. 643,923 filed Mar. 5, 1957.

This invention pertains to a new hydraulic fluid additive. More particularly, it pertains to glycol based compositions which have a high degree of oxidation and corrosion resistance. It especially relates to glycol-based compositions which are single phase liquids, i.e. solutions which contain the essential components to provide the foregoing inhibiting functions, that can be easily added to organic fluids such as glycols and ethers of glycols and which will impart thereto a high degree of oxidation resistance, corrosion protection and buffering action. Accordingly, the compositions of this invention are extremely useful as hydraulic brake fluid additives.

As set forth in my copending applications, the corrosion propensities of organic fluids such as ethylene, diethylene, propylene, dipropylene and triethylene glycols could, to some extent, be buffered or inhibited by directly adding thereto a minor proportion of an alkali metal or alkaline earth metal borate such as sodium or potassium tetraborate in the form of a solid decahydrate or pentahydrate, i.e. a borate having water of hydration. However, such a procedure has many disadvantages in that the insolubility of such borate compounds in glycol ethers and other glycol derivatives required the use of ethylene glycol in order to dissolve the tetraborates and because the water of hydration in the tetraborates and the water of condensation formed by the reaction involved in solubilizing the tetraborates in ethylene glycol combine with the low boiling point of ethylene glycol to adversely affect the boiling point and other physical properties of brake fluid formulations.

It has also been the practice to separately introduce into organic fluids, such as the foregoing, other inhibitors to provide oxidation resistance for the organic fluid as well as metal inhibitors and deactivators to obtain special corrosion protection for specific metals in which the organic fluids operate. To get these inhibitors into solution required that the inhibitor be soluble in the organic fluid into which it was to be incorporated and also, generally required the use of heat and agitation to get the inhibitor, normally a solid, into solution.

The present invention takes advantage of the invention disclosed in my copending applications aforesaid insofar as it adds a condensation product having therein both glycol and borate compounds to the organic fluid for corrosion protection and buffering in lieu of the natural tetraborates, thereby increasingly the solubility characteristics of the inorganic borates and eliminating the adverse effect of the water of hydration present in the natural tetraborates.

Thus, I have discovered that it is possible to include in a single fluid additive all the compounds which are necessary to achieve good oxidation resistance, corrosion protection and buffering action in the final organic fluid and at the same time accomplish this result without adverse effect upon the boiling point or corrosion resisting properties of the final fluid. This discovery has many advantages. It provides a condensation solution which contains in a single phase all of the corrosion and oxidation resisting properties required in an organic fluid, as for example, a brake fluid. It is productive of light a liquid which can be added directly to organic fluids such as brake fluid in one operation, eliminating the necessity for presolution, agitation and heating thereby greatly simplifying and reducing the time required for fluid compounding. The great solubility of the new condensate allows its use with base organic fluids for preparing brake and other hydraulic fluid formulations not possible with conventional additives. It makes possible the use of a single complete inhibitor component for hydraulic brake fluids.

Thus, it is a principal object of the present invention to provide a new hydraulic fluid condensation product useful for brake fluids and the like which provides oxidation resistance, corrosion protection and buffering action.

Another object is to provide a process for effectuating the preceding object.

A further object is to provide single phase additives for hydraulic fluids which are light liquids that may be directly added to such fluids in one operation eliminating the necessity for pre-solution, agitation or heating and reducing the time for fluid compounding.

Other objects and advantages of the invention will appear as the description progresses.

The products of the present invention may be produced by stirring together solid alkali metal or alkali earth metal tetraborates or metaborates, a glycol containing from two to six carbon atoms inclusive and/or a glycol ether thereof, and one or more anti-oxidants and/or corrosion inhibiting assists. In addition, the mixture may include minor amounts of stain inhibitors and anti-rust inhibitors or coupling agents or carriers for rendering certain inhibitor components more compatible with the glycols. These ingredients will be used in amount and number depending upon the ultimate product and use. In all cases, however, the number and amount of other inhibitors and agents dissolved in the glycol or glycol ethers controls the amount of borate included in the mixture. The total of solids in the composition will preferably not exceed between 50% to 65% by weight. Larger amounts may produce condensates that are too viscous for use. The reactants are heated to a temperature in the range of about 75° C. to 140° C. for a period of about 15 minutes to 1 hour. The pressure employed during the reaction is not critical. However, caution must be taken when pressure greater than atmospheric is used since some of the compounds may deteriorate. Preferably, a pressure in the range of 10 mm. to 30 mm. of mercury is employed since this is a convenient way in which water is generated during the reaction can be removed from the desired product. Excellent results have been achieved at a pressure in the range of 25 to 29 mm. of mercury.

The condensation products of the invention may also be prepared without physically removing water from the reaction mixture by using a form of borate which is substantially or completely dehydrated, for example, anhydrous sodium tetraborate. The water produced by the condensation reaction is then apparently taken up by the condensation complex.

The glycols which are reacted with the tetraborates and metaborates of the alkali metals and of the alkaline earth metals will preferably be those containing from 2 to about 6 carbon atoms, for example, ethylene glycol, diethylene glycol, triethylene glycol, propylene glycol, hexylene glycol, 2,3-butanediol and 1,4-butanediol and straight glycol ethers of the foregoing containing up to about 6 carbon atoms, and commercial monoalkyl ethers of such glycols, wherein the alkyl group contains from 1 to about 4 carbon atoms such as monomethyl ether of diethylene glycol ($CH_3OCH_2CH_2OCH_2CH_2OH$) monoisopropyl ether of diethylene glycol [$(CH_3)_2COCH_2CH_2OCH_2CH_2OH$] and monobutyl ether of diethylene glycol $$(CH_3CH_2CH_2CH_2OCH_2CH_2OCH_2CH_2OH)$$

which ethers preferably and almost always contain a minor amount of a glycol as a diluent and with which the borate may react to form condensed products with release of water of hydration and/or of condensation depending upon the conditions of the reaction and the character of the borate. For example, a borate may be reacted with a monoalkyl ether of a glycol such as diethylene glycol monoethyl ether ($CH_3CH_2OCH_2CH_2OCH_2CH_2OH$) containing a straight glycol in sufficient amount to carry the reaction. Ethylene and diethylene glycols are preferred because of their ability to combine with greater concentrations of borate and to combine with other inhibitors hereafter to be described. Typical preferred borates are sodium tetraborate, $Na_2B_4O_7 \cdot 10H_2O$ and $Na_2B_4O_7 \cdot 5H_2O$, potassium tetraborate, $K_2B_4O_7 \cdot 5H_2O$ and sodium metaborate $NaBO_2 \cdot 4H_2O$. Single phase condensation inhibitors prepared from the sodium metaborate have especially good commercial properties since they form products which are fluid, stable and which have higher alkalinity reserves. The borate compound used in the composition of this invention should be employed in such quantity that the product composition contains from about 5 to 20 weight percent of borate compound based on the weight of the total composition and preferably about 8 to 15 weight percent.

The preferred compositions of the present invention for use as an additive composition for glycol and other organic fluids are those which do not contain more water than corresponds to the water formed in condensation of the reactants. Such compositions result when the initial reactants do not contain any water or water of hydration, or when an amount of water at least equal to the water of hydration of the borate is removed in preparation of or formation of the product composition. Reactants containing up to about 0.5% unbound or free water, which amounts will usually not be present in the reactants as sold commercially even if an extra step of vacuum stripping is eliminated, have been found to be operative in the accomplishment of the objects of this invention.

The actual amount of water which may be removed when the reactants are mixed and heat reacted in suitable proportions may approach and in some cases equal the maximum water theoretically available from the reaction, i.e. the total water of hydration of the borate reactant plus one mole of water for each mole of glycol plus any free water contained in the other compounds. For example, where one mole of sodium tetraborate penthydrate and 5 moles of ethylene glycol are reactants, it is possible to remove by reaction 10 moles of water. This is shown by the following equation:

one mole of $Na_2B_4O_7 \cdot 5H_2O$ + 5 moles $HOCH_2CH_2OH$ $\xrightarrow{\Delta}$ $[(CNa_2B_4O_7)5(-CH_2CH_2O-)]$ + 10 moles $H_2O$ A range of products may thus be produced depending upon the extent of water removal and the number and kind of additional inhibitors included in the reaction mixture.

It is possible to prepare condensed products which contain less than the preferred maximum water content described above and which are nevertheless readily pourable liquids at a convenient working temperature in the range of about 10° C. to 100° C. Although the minimum water content for such a liquid product varies considerably with the particular initial ingredients chosen and with the proportions of initial ingredients combined, and the temperatures and pressures employed in the condensation reaction, liquid products are obtainable if the water removed does not exceed the sum of any water of hydration of the initial borate reactant and approximately half of the condensation water corresponding to complete condensation of the borate and other reactants and the glycol or glycol derivative. Such complete condensation, as for example where only a borate reactant is involved, normally releases one mole of water per mole of glycol, or 0.5 mole of water per mole of monoalkyl ether of a glycol.

It will be understood that the products of the present invention are characterized by the presence of alkali metal or alkaline earth metal in a definite proportion to the boron and are, therefore, distinguished from previously known condensation products of alcohols with boric acid, for example. They are also characterized by the initial presence of only one or two hydroxyl groups per molecule of the initial organic compound, in contrast to previously known reactions of alkali metal borates with polyfunctional configurations containing more than two hydroxyl groups.

The anti-oxidation inhibitors to be effectively used as reactants must enable the formulation of clear liquid condensates. They must not form insoluble precipitates or resinous separations. They must be soluble in a glycol or glycol ether, or mixtures thereof when subjected to the conditions of the condensation reaction.

For example, 2,2′-bis(p-hydroxyphenyl) propane known commercially as Bisphenol A; N-phenyl morpholene and hydroquinone form satisfactory condensates, but anti-oxidants such as 2–5 ditertiary butyl hydroquinone, polymerized trimethyl dihydroquinoline (Agerite Resin D) and styrenated phenol (Agerite Spar) form insoluble precipitates or resinous separations which are unsatisfactory as reactants when a straight glycol is to be the sole glycol component in the product. Acceptable condensation products providing anti-oxidant properties may be obtained using these anti-oxidants when a glycol ether reactant is employed in the product. Thus, 2–5 ditertiary butyl hydroquinone, polymerized dihydroquinoline, and styrenated phenol may be used in a product wherein the glycol component is a monoalkyl glycol ether or a mixture of glycol and monoalkyl glycol ether, containing at least 15 weight percent of the glycol ether.

Biphenol A is a preferred inhibitor component in the compoistions of this invention because it imparts no color to brake fluid formulations and inhibits depolymerization of many polymers. Although known as an anti-oxidant, it has been difficult to use in organic fluids because it is a white flake solid requiring considerable heat, agitation and time to dissolve in glycol or glycol ethers. This difficulty is avoided when it is added as a condensate reactant. N-phenyl morpholine is less desirable than Bisphenol A as an anti-oxidant but is especially useful in combination with Bisphenol A. Hydroquinone is also useful but it has a tendency to darken brake fluids when used as an anti-oxidant therein, and also appears less effective in this role than Bisphenol A. Dow Chemical Bisphenol A resin grade is mose effective. Agerite Resin D is particularly effective where low percentages by weight of the anti-oxidants must be used. The compositions of this invention must include at least one of the foregoing anti-corrosion compounds i.e., 2,2′-bis(p-hydroxyphenyl)propane, N-phenyl morpholene, hydroquinone, 2,5-ditertiary butyl hydroquinone, polymerized trimethyl dihydroquinoline and styrenated phenol. More than one such compound may be used, however, and the concentration of such compounds in the product composition of this invention should be in the range of 10 to 40 weight percent, based on the weight of the total composition. A preferable range is from 15 to 35 weight percent.

Other compounds having application in the single phase condensation products of this invention are sodium nitrate which is beneficial as a corrosion inhibitor assistant in certain hydraulic brake formulations: tri(tertiary-amylphenyl) phosphite containing up to 10 weight percent of dicyclohexylamine (Santolube 31) which provides specific corrosion inhibiting properties for cast iron and steels;

mercapto benzothiazole is particularly effective in inhibiting corrosion of copper and brass; sodium meta arsenite is effective in eliminating or reducing the discoloration staining of aluminum; in addition certain organic silicate esters have been found to be effective as aluminum inhibitors. The use of the above compounds, namely sodium nitrate, sodium meta arsenite, tri(tertiary-amylphenyl) phosphite containing dicyclohexylamine, and mercaptobenzothiazole is not necessary in the compositions of this invention. However, if one or more are employed then the quantity should be such as to furnish a concentration of about 0.01 to 2.5 weight percent of the product solution.

From the foregoing, it is seen that this invention provides new hydraulic fluid additives comprising an organic compound, a borate compound and an antioxidant compound. For certain applications it has been found desirable to include a fourth component in the compositions of this invention, namely, an anticorrosion compound although it should be understood that this latter compound is not essential.

The organic compound which is used in this invention is a glycol, monoalkyl glycol ether or mixture of glycol and monoalkyl glycol ether. The preferred glycols are those having about 2 to 6 carbon atoms. The preferred monoalkyl glycol ethers are those in which the alkyl group contains about 1 to 4 carbon atoms and the glycol portion of the glycol ether contains about 2 to 6 carbon atoms.

The preferred borate compounds for use in the compositions of this invention are alkali metal tetraborates and metaborates, and alkaline earth metal tetraborates and metaborates or mixtures of any of these. The preferred antioxidant compounds in the compositions of this invention are 2,2'-bis(p-hydroxyphenyl) propane, N-phenyl morpholine, hydroquinone, 2,5-ditertiary butyl hydroquinone, polymerized trimethyl dihydroquinoline and styrenated phenol or mixtures of the foregoing. The preferred anticorrosion compounds are sodium meta arsenite, sodium nitrate, tri(tertiary-amylphenyl)phosphite, containing dicyclohexylamine and mercaptobenzothiozole or mixtures of the foregoing.

The exact chemical structure of the composition of this invention has not been absolutely established. It has been established that the glycol and borate components undergo a condensation reaction. However, it has not been determined if the various antioxidants and anticorrosion compounds enter into a chemical reaction with the borate and glycol components or are held in solution through some physical mechanism. In some instances, the glycol-borate condensate may act as a solvent for the other components. In any event, it is surprising and unexpected that the various antioxidants and anticorrsion compounds could be placed into solution along with the glycol and borate compounds. For example, it is known that certain antioxidants could be used in conjunction with glycols and boric acid. However, in such cases the antioxidant was basic and it simply formed a salt with the boric acid. In the present invention, no acid is encountered and accordingly, there can be no formation of salt complexes. Therefore, it was totally unexpected that the antioxidants would form a solution with the other components of this invention and thereby provide a composition which eliminates the need for those in the field, such as repair and garage men, to spend time on the difficult task of mixing, stirring and heating a hydraulic fluid in order to dissolve therein various antioxidants and corrosion inhibitors.

While in some instances it is possible to use the compositions of this invention as the final hydraulc fluid, it is preferred that they be used as an additive with conventional glycol based hydraulic fluids. The most desirable concentration of the additive composition in hydraulic fluids, although varying considerably with many factors such as the proportion of borate in the additive composition and the type of service for which the treated hydraulic fluid is intended, is usually between 0.2% and about 10% by weight.

A fuller understanding of the invention and of its objects and advantages will be had from the following examples of specific condensate products and of typical processes by which they may be produced. These examples are intended only for illustration of the invention and not as a limitation upon its scope.

*Example 1*

308 grams of ethylene glycol, 125 grams of sodium tetraborate decahydrate ($Na_2B_4O_7 \cdot 10H_2O$), 165 grams of Bisphenol A, and 4.4 grams of sodium nitrate were reacted at a maximum vacuum of 27 inches of Hg and a maximum tempertaure of 250° F. to produce an amber colored viscous fluid having a composition of 12.3% by weight of $Na_2B_4O_7$, 31% by weight of Bisphenol A and 0.84% by weight of sodium nitrate, the remainder being ethylene glycol. During the reaction all the water of hydration and some water of reaction (less than half) was removed by the distillation leaving a single phase condensate composition liquid at room temperature readily soluble in organic fluids containing typical mitxures of glycols, glycol ethers and polyglycols to provide excellent corrosion and oxidation stability.

*Example 2*

308 grams of ethylene glycol, 103 grams of sodium tetraborate pentahydrate ($Na_2B_4O_7 \cdot 5H_2O$), 185 grams of Bisphenol A, 5.7 grams of sodium nitrate, 0.3 grams of sodium meta arsenite, and 1.5 grams mercaptobenzothiazole were reacted at a maximum vacuum of 28.5 inches of Hg and a maximum temperature of 230° F. to produce a straw colored viscous fluid having a composition of 12.4% by weight of $Na_2B_4O_7$, 32.3% by weight of Bisphenol A, 1.0% sodium nitrate, 0.05% sodium meta arsenite and 0.25% mercaptobenzothiazole, the remainder being ethylene glycol. During the reaction all of the water of hydration and some water of reaction (less than half) was removed by the distillation leaving a single phase condensate composition liquid at room temperature readily soluble in organic fluids as in Example 1.

*Example 3*

308 grams of ethylene glycol, 122 grams of Bisphenol A, 82 grams of sodium tetraborate decahydrate, 4 grams of sodium nitrate, 47 grams of N-phenyl morpholine and 1 gram of mercaptobenzothiazole were reacted at a maximum vacuum of 28.5 inches of Hg and a maximum temperature of 230° F. to produce a dark amber colored viscous fluid having a composition of 10.0% by weight $Na_2B_4O_7$, 21.6% by weight of Bisphenol A, 8.3% by weight of N-phenyl morpholine, 0.7% by weight of sodium nitrate and 0.17% by weight of mercaptobenzothiazole, the remainder being ethylene glycol. During the reaction all of the water of hydration and some water of reaction (less than half) was removed by the distillation, leaving a single phase condensation composition liquid at room temperature readily soluble in organic fluids as in Example 1.

*Example 4*

308 grams of ethylene glycol, 114 grams of sodium tetraborate decahydrate, 6.1 grams of sodium nitrate, and 78.8 grams of hydroquinone were reacted at a maximum vacuum of 28.5 inches of Hg and a maximum temperature of 230° F. to produce a very dark amber colored viscous fluid having a composition of 16.7% by weight $Na_2B_4O_7$, 16.7% by weight of hydroquinone and 1.3% by weight of sodium nitrate, the remainder being ethylene glycol. During the reaction all of the water of hydration and some water of reaction (less than half) was removed by the distillation, leaving a single phase condensation composition liquid at room temperature readily soluble in organic fluids as in Example 1.

Example 5

154 grams of ethylene glycol, 154 grams of diethylene glycol, 88 grams of potassium tetraborate $$(K_2B_4O_7 \cdot 4H_2O)$$

203 grams of Bisphenol A, 5.7 grams of sodium nitrate, 0.3 gram of sodium meta arsenite were reacted at a maximum vacuum of 28 inches of Hg and a maximum temperature of 230° F. to produce a straw colored viscous fluid having a composition of 12.5% by weight of $K_2B_4O_7$, 32.6% by weight of Bisphenol A, 1.0% by weight of sodium nitrate and 0.05% by weight of sodium meta arsenite, the remainder being ethylene glycol and diethylene glycol in equal percent by volume. During the reaction all of the water of hydration and some water of reaction (less than half) was removed by the distillation, leaving a single phase condensation composition liquid at room temperature readily soluble in organic fluids as in Example 1.

Example 6

186.2 grams of ethylene glycol, 82.8 grams sodium metaborate ($NaBO_2 \cdot 4H_2O$), 95 grams Bisphenol A, 0.05 gram of sodium meta arsenite and 0.75 gram Santolube 31 were reacted at a maximum vacuum of 28 inches of Hg and a maximum temperature of 240° F. to produce a light amber colored viscous fluid containing a composition of 12.3% by weight of $NaBO_2$, 29.55% by weight of Bisphenol A, 0.16% by weight of sodium meta arsenite and 0.23% by weight of Santolube 31, the remainder being ethylene glycol. During the reaction all of the water of hydration and some water of reaction (less than half) was removed by the distillation, leaving a single phase condensation composition liquid at room temperature readily soluble in organic fluids as in Example 1.

Example 7

186.2 grams of ethylene glycol, 93.1 grams of Dowanol T.P.M. (tripropylene glycol methyl ether), 69.0 grams of sodium metaborate ($NaBO_2 \cdot H_2O$), 85 grams Bisphenol A, 0.10 gram sodium meta arsenite, 7 grams B. F. Goodrich "Resin D" (trimethyl dihydroquinoline) were reacted at a maximum vacuum of 28 inches of Hg and a maximum temperature of 240° F. to produce a dark amber colored slightly viscous fluid having a composition of 8.15% by weight of $NaBO_2$, 21% by weight of Bisphenol A, 0.025% by weight of sodium meta arsenite, and 1.73% by weight of Resin D, the remainder being two parts by volume of ethylene glycol to one part by volume of tripropylene glycol methyl ether. During the reaction all of the water of hydration and some water of reaction (less than half) was removed by distillation, leaving a single phase condensation composition liquid at room temperature readily soluble in organic fluids as in Example 1.

The polymerized trimethyl dihydroquinoline in this single phase inhibitor condensation liquid serves as a specific antirust and anti-oxidation booster inhibitor. The Dowanol T.P.M. serves to solubilize the Resin D in the condensate reaction.

Compositions of this character may also be made using similar or higher percentages of 2,5-ditertiary butyl hydroquinone or Agerite Spar (styrenated phenol) in place of or in addition to "Resin D."

Example 8

600 grams of propylene glycol, 98 grams of sodium tetraborate decahydrate ($Na_2B_4O_7 \cdot 5H_2O$), 140 grams Bisphenol A and 4.3 grams sodium nitrate were reacted at a maximum vacuum of 28 inches of Hg and a maximum of 210° F. to produce a light straw colored, very light viscosity fluid having a composition of 8.34% by weight of $Na_2B_4O_7$, 17.2% by weight of Bisphenol A, and 0.53% by weight of sodium nitrate, the remainder being propylene glycol. During the reaction all of the water of hydration and some water of reaction (less than half) was removed by distillation, leaving a single phase condensation composition liquid at room temperature readily soluble in organic fluids as in Example 1.

This composition is particularly effective when used with hydraulic organic fluid compositions containing high percentages (40 to 50% by weight) of castor oil or castor oil derivatives.

Example 9

Brake fluid formulations were prepared by adding to 48% by volume of Dowanol DE (diethylene glycol ethyl ether), 22% by volume of Dowanol T.P.M. (tripropylene glycol methyl ether), 21% by volume of Dow Polyglycol 15–200 which is a polyglycol having a molecular weight of about 2600 and having the formula:

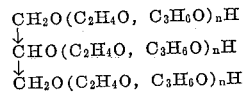

and 5% by volume of diethylene glycol and 4% by volume of ethylene glycol, between 1.5 to 3% by weight of the foregoing composition of any of the liquid inhibitor condensation compositions of Examples 1 to 8 aforesaid at room temperature with sufficient agitation to uniformly disperse the same therein.

It is apparent from the foregoing description and examples that the objects of this invention have been accomplished. A new composition has been provided which provides for oxidation resistance, corrosion protection and buffering action in hydraulic fluids and which eliminates the necessity for pre-solution, agitation and heating now required when compounding hydraulic fluids.

I claim:

A substantially water free hydraulic fluid additive composition produced by simultaneously contacting by stirring together at a temperature in the range of about 75° C. to 140° C.:

(1) an organic compound selected from the group consisting of
  (a) glycols containing from 2 to about 6 carbon atoms,
  (b) monoalkyl ethers of glycols wherein the alkyl group contains from 1 to about 4 carbon atoms and the glycol portion thereof contains from 2 to about 6 carbon atoms,
  (c) mixtures of above said monoalkyl ethers of glycols and glycols, said mixtures containing a minimum of about 15 weight percent of said ethers,
(2) a borate compound selected from the group consisting of
  (a) alkali metal tetraborates,
  (b) alkali metal metaborates,
  (c) alkaline earth metal tetraborates,
  (d) alkaline earth metal metaborates, and
  (e) mixtures of the foregoing,
(3) an antioxidant compound, when said organic compound (1) is only a glycol (1–a), selected from the group consisting of
  (a) 2,2'-bis(p-hydroxyphenyl)propane,
  (b) N-phenyl morpholine,
  (c) hydroquinone, and
  (d) mixtures of the foregoing and said antioxidant compound, when said organic compound (1) is selected from the group consisting of glycol ethers (1-b) and mixtures of glycol ethers and glycols (1-c) as defined hereinabove, being selected from the group consisting of
  (e) 2,2'-bis(p-hydroxyphenyl)propane,
  (f) N-phenyl morpholine,
  (g) hydroquinone,
  (h) 2,5-ditertiary butyl hydroquinone,
  (i) polymerized trimethyl dihydroquinoline,
  (j) styrenated phenol, and (k) mixtures of the foregoing,
(4) an anti-corrosion compound selected from the group consisting of
   (a) sodium meta arsenite,
   (b) sodium nitrate,
   (c) tri(tertiary - amyphenyl)phosphite containing dicyclohexylamine,
   (d) mercaptobenzothiazole, and
   (e) mixtures of the foregoing,
said addition composition containing from about 5 to 20 weight percent of said borate compound (2), from about 10 to 40 weight percent of said antioxidant compound (3), about 0.01 to 2.5 weight percent of said anticorrosion compound (4), and the remainder being said organic compound (1); furthermore said additive composition having a maximum water content not substantially exceeding the water formed by the interreaction of the component compounds and being a readily pourable liquid at a temperature of 10° C.

References Cited

UNITED STATES PATENTS

| | | |
|---|---|---|
| 2,151,300 | 3/1939 | Moran et al. _____ 252—389 X |
| 2,497,521 | 2/1950 | Trautman _____ 252—389 |
| 2,795,548 | 6/1957 | Thomas et al. _____ 252—75 X |
| 2,803,604 | 8/1957 | Meighen _____ 252—75 |
| 2,815,328 | 12/1957 | Green et al. _____ 252—75 |
| 2,979,524 | 4/1961 | Wright et al. _____ 252—75 X |
| 2,982,733 | 5/1961 | Wright et al. _____ 252—389 X |
| 3,005,776 | 10/1961 | Langer _____ 252—75 X |

LEON D. ROSDOL, *Primary Examiner.*

SAMUEL H. BLECH, *Examiner.*

S. D. SCHWARTZ, *Assistant Examiner.*